United States Patent [19]

Dockter et al.

US005687367A

[11] Patent Number: 5,687,367

[45] Date of Patent: Nov. 11, 1997

[54] FACILITY FOR THE STORAGE AND MANAGEMENT OF CONNECTION (CONNECTION SERVER)

[75] Inventors: Michael J. Dockter, Hollister; Joel F. Farber, San Jose, both of Calif.; Kevin D. Seppi, Austin, Tex.; David W. Tolleson, San Jose, Calif.

[73] Assignee: International Business Machines Corp., Armonk, N.Y.

[21] Appl. No.: 741,291

[22] Filed: Oct. 30, 1996

Related U.S. Application Data

[63] Continuation of Ser. No. 267,022, Jun. 21, 1994, abandoned.
[51] Int. Cl.$^6$ ..................................................... G06F 17/30
[52] U.S. Cl. ........................... 395/613; 395/611; 395/614
[58] Field of Search .................................. 395/611, 613, 395/614

[56] References Cited

U.S. PATENT DOCUMENTS

| | | | |
|---|---|---|---|
| 4,905,163 | 2/1990 | Garber et al. | 364/513 |
| 4,914,586 | 4/1990 | Swinehart et al. | 364/200 |
| 4,930,071 | 5/1990 | Tou et al. | 364/300 |
| 5,369,778 | 11/1994 | San Soucie et al. | 395/800 |
| 5,404,534 | 4/1995 | Foss et al. | 395/700 |
| 5,410,688 | 4/1995 | Williams et al. | 395/600 |
| 5,418,942 | 5/1995 | Krawchuk et al. | 395/600 |
| 5,421,008 | 5/1995 | Banning et al. | 395/600 |
| 5,423,043 | 6/1995 | Fitzpatrick et al. | 395/700 |
| 5,446,891 | 8/1995 | Kaplan et al. | 395/600 |
| 5,448,727 | 9/1995 | Annevelink | 395/600 |

FOREIGN PATENT DOCUMENTS

| | | | |
|---|---|---|---|
| 467591 | 1/1992 | European Pat. Off. | 15/40 |
| 501770 | 2/1992 | European Pat. Off. | 15/419 |
| 483576 | 5/1992 | European Pat. Off. | 15/40 |
| 483577 | 5/1992 | European Pat. Off. | 15/40 |
| 10913 | 9/1990 | WIPO | 15/419 |

OTHER PUBLICATIONS 7.0 Appendix A. Related Industry Acticles / Data, 7.1 Hypertext Requirements, Oct. 1991.

Korth and Silberschatz, *Database System Concepts*, McGraw-Hill, (New York, 1986), pp. 380–390.

Don Steinberg, "Demon Knowbots", *PC-Computing*, vol. 3, No. 1, Jan., 1990, pp. 135–136.

Bertino et al., "Object-Oriented Database Management Systems: Concepts and Issues", *Computer*, vol. 24, No. 4, Apr., 1991, pp. 33–47.

Anonymous, "Edify Information Agent Delivers information Across Networks", *Software Magazine*, May 15, 1992, vol. 12, No. 7 p. 58.

Anonymous, "Internet the Electronic Octopus", *Information Industry Bulletin*, vol. 8, No. 41, Oct. 29, 1992, pp. 4–8.

Oren Etzioni, "Building Softbots for UNIX", *Preliminary Report*, Department of Computer Science and Engineering, University of Washington, Seattle, Washington, Nov., 1992, pp. 1–19.

(List continued on next page.)

Primary Examiner—Thomas G. Black
Assistant Examiner—Paul R. Lintz
Attorney, Agent, or Firm—Randy W. Lacasse; David J. Kappos; Marilyn S. Dawkins

[57] ABSTRACT

A Connection Server provides very flexible structures for the identification of objects to be interconnected, the identification of the links which connect them, and the auxiliary information needed to materialize objects when they are referenced. The connection Server is designed as a stand-alone reusable component. It interfaces with other independent components for services such as classification attributes, distributed database services, Noumena (object) storage, etc. Clean public programming interfaces are available for all components. It is independent from the "front-end", the user driven display of the Connections and associated meta-data. It is independent from any authoring facilities which may be used to customize the services, meta-data, etc., that are provided.

26 Claims, 2 Drawing Sheets

OTHER PUBLICATIONS

Larry Press, "The Net: Progress and Opportunity. (The Internet and The Global Network to Which it is Connected)", *Communications of The ACM*, vol. 35, No. 12, Dec., 1992, pp. 21–26.

Laurie Flynn, "Just Do It My Way: 'Intelligent Agent' Technology Learns to Compute the Way You Do", *San Jose Mercury News*, Jan., 24 1993, pp. 2F–3F.

Mitch Ratcliffe, "General Magic Will Do Its Trick on Macs, PDAs. (Personal Digital Assistants)", *MacWeek*, vol. 7, No. 6, Nov., 1993, pp. 1–2.

Habermann, "The High Performance Computing and Communications Initiative in the US", Abstract only, *Proceedings ISADS 93. International Symposium on Autonomous Decentralized Systems*, Kawasaki, Japan, 30 Mar.–1 Apr. 1993, pp. 10.

Obraczka et al., "Internet Resource Discovery Services", *Computer*, vol. 26, No. p. 1 Sep., 1993, pp. 8–22.

Anonymous, "A Generalist's View of General Magic: My Visit to VapidWare", *P.C. Letter*, vol. 9, No. 7, pp. 6, no date.

D. Gaiti, "Intelligent Distributed Systems: New Trends", *Proceedings of the Fourth Workshop on Future Trends of Distributed Computing Systems*, Lisbon Portugal, 22–24 Sep. 1993, pp. 106–111.

Smalley et al., "AT&T To Unveil On–Line Service Featuring Intelligent Agents", *PC Week*, vol. 10, No. 49, Dec. 13, 1993, pp. 1–2.

Marius Busuioc, "Distributed Cooperative Agents for Service Management in Communications Network", *IEE Eleventh UK Teletraffic Symposium. Performance Engineering in Telecommunications Networks*, Cambridge, UK, 23–25 Mar. 1994, pp. 24/1–24/7.

Michael Bieber, "Automating Hypertext for Decision Support", Hypermedia and Information Reconstruction: Aerospace Applications & Research Directions, NTIS ACC#N91–21951/9/XAB, 3–5 Dec. 1990, Houston, Texas, pp. 117–127, Dec. 1990.

FACILITY FOR THE STORAGE AND MANAGEMENT OF CONNECTION (CONNECTION SERVER)

This application is a continuation of application Ser. No. 08/267,022, filed Jun. 21, 1994, now abandoned.

BACKGROUND OF THE INVENTION

1. Field of Invention

The present invention relates to a system for managing data object links. More specifically, the present invention provides for a generic link(connection) server which is accessible to a multitude of differing systems.

2. Related Materials and Definitions

This application is related to the following co-pending applications which are hereby incorporated by reference:
UNIVERSAL TAG IDENTIFIER ARCHITECTURE—Ser. No. 07/963,885, now U.S. Pat. No. 5,414,841,
METHOD FOR GENERATING CONNECTIONS BETWEEN OBJECTS IN A COMPUTER NETWORK (GRINDING) (application Ser. No. 08/262,999) now U.S. Pat. No. 4,608,900,
FACILITY FOR THE INTELLIGENT SELECTION OF INFORMATION OBJECTS (PERSONA) (application Ser. No. 08/262,834), pending
FACILITY FOR THE STORAGE AND MANAGEMENT OF INFORMATION OBJECTS (NOUMENA SERVER) (application Ser. No. 08/263,146), now U.S. Pat. No. 5,557,740,
METHOD FOR ASSOCIATION OF HETEROGENEOUS INFORMATION (application Ser. No. 08/263,379)
METHOD FOR STORING AND RETRIEVING HETEROGENEOUS CLASSIFICATION SYSTEMS (application Ser. No. 08/263,379), pending.

The following definitions may be helpful to the understanding of the terminology as cited throughout the above related materials. This terminology may be used throughout the background, specification and claims of the present invention:

Tags: Tags are globally unique identifiers. Tags are sequentially numbered identifiers identifying data objects (i.e. video, text, audio, observations, opinions, etc.)

Phenomena: The logical structure of the system begins with a unit of human perception, the "phenomena". In the universe of a computer system, "Phenomena" is defined as a representation of phenomena which exist in the universe of human experience. Phenomena can be ideas, written matter, video, computer data, etc. Examples include viewing a computer file using a word processor, watching a digital video clip, or listening to a digital audio segment.

Connections: That which gathers (or links) Phenomena into interrelated collections. Connections are that which lead the user from one Phenomena to another Phenomena. Connections are not simply a road-map from a Phenomena to all other Phenomena. More specifically, Connections represent an observation of related Phenomena made by human or by computer observers.

Connection Attributes: In the logical structure of the system, "Connection Attributes" allow the entire network of Phenomena and Connections to become usable to each user of the system. Connection Attributes store the rationale behind each connection. In fairly generic terms, Connection Attributes describe the Who, What, Where, When and Why of a particular observation.

Noumena: Another concept in the logical structure of the system is "Noumena". Noumena are that which lie beyond the realm of human perception. In computer-based systems, such as the instant invention, they are the computer stored data, examples are "computer files" or datasets" When these computer files, the Noumena, are observed in their "raw" form, they do not resemble pictures, sounds, nor words. These Noumena resemble a series of bits, bytes, or numbers. These computer files must be manipulated by computer programs, "Phenominated", to become as they appear to the observer. In the present system, Noumena are all of the generic format computer files needed to produce a representation of a Phenomena. This includes the computer data files as well as the computer program files.

Grinding: Grinding is a systematic, computer-based observation of Phenomena. This is typically done with a "narrow view". The programs are usually looking for well defined criteria. When Phenomena are observed by the computer programs, the programs make Connections between the observed Phenomena and other Phenomena known by the programs. In effect, acting as a human observer would when viewing a Phenomena and manually Connection it to other Phenomena.

Persona: to determine the value of information based on each user's subjective preferences.

Capture: During knowledge capture, the human or computer observer Connects two Phenomena and provides the rationale for the Connection by supplying Connection Attributes. The user can also Connect a new Phenomena to previously existing Phenomena.

Retrieve: During knowledge retrieval, an observer navigates from Phenomena to Phenomena via Connections. Knowledge is delivered by experiencing the reconstituted Phenomena. Which knowledge is delivered is controlled by the Connections and the assessment of the Connection Attributes, preferably under the auspices of a Persona.

The present invention supports the overall system of co-pending application "Method for Association of Heterogeneous Information". It supports the Tag Architecture, Connection Server, Grinding, Noumena Server and the design and infrastructure of the overall system, but is not limited thereto.

The term "Phenomena" could be read "object", and the term "Connection" could be read "link" in this disclosure. The distinction between Noumena and Phenomena is made to distinguish between objects as experienced by users (Phenomena) and objects as they are actually stored (Noumena).

DISCUSSION OF PRIOR ART

General purpose connection servers for Hypertext or Hypermedia systems are not presently available. Existing Hypertext systems are closed. Their links are private and proprietary. They hide their links of data objects from view, modification, and adaptation to other uses. The existing link structures are inflexible, difficult to extend and generalize. As these current systems evolve, they are having significant problems with migration, versioning, and general storage management.

The following descriptions provide some insight as to the attempts of prior systems to connect objects and manage the results thereof. The prior art is deficient with respect to providing efficient and accessible storage and retrieval of knowledge obtained during the course of trying to link information objects.

HYPERTEXT/HYPERMEDIA

Hypertext, and its multimedia counterpart hypermedia, are methods used by programmers to interconnect references to additional related sources. Hypertext programmers usually store maps of selected links for a particular application within the application itself. The limitations of Hypertext are its static authoring linking process, rapid development of large volumes of data and its inability to crosslink easily to remotely located, and incompatible, sources of information. The most beneficial uses of hypertext/hypermedia are restricted to the workstation level.

Entity-Relationship model

Chen developed the "Entity-Relationship Model". Chen sought to model the relationships universal to a class of entities. His goal was to unify data models for the rigid, predefined, structure provided in database systems. The system fails to provide for a dynamic individualized method to interrelate instances of information, but rather is directed to relating entire classes of information.

As seen by the above descriptions a need exists for a universally compatible and accessible method/apparatus for obtaining and using links of data objects, especially in the ever expanding world of multi-media.

SUMMARY OF THE INVENTION

The present invention, hereafter, Connection Server, is a general purpose, extensible facility, with accessible interfaces that can be included as a component in many systems. This Connection Server component is designed to provide a generic link management facility. The present invention creates a general purpose facility for the storage and management of Connections that is tailorable, accessible, and tune-able for many purposes. Consumers of this service want to interact with this system with a minimum effort and be connected to associated objects with the least cost and time.

The Connection Server described here provides very flexible structures for the identification of objects to be interconnected, the identification of the links which connect them, and the auxiliary information needed to materialize objects when they are referenced.

The Connection Server is designed as a stand-alone reusable component. It interfaces with other independent components for services such as classification attributes, distributed database services, Noumena (object) storage, etc. Clean public programming interfaces are available for all components. It is independent from the "front-end", the user driven display of the Connections and associated meta-data. It is independent from any authoring facilities which may be used to customize the services, meta-data, etc., that are provided.

DETAILED DESCRIPTION OF INVENTION

Figure 1:
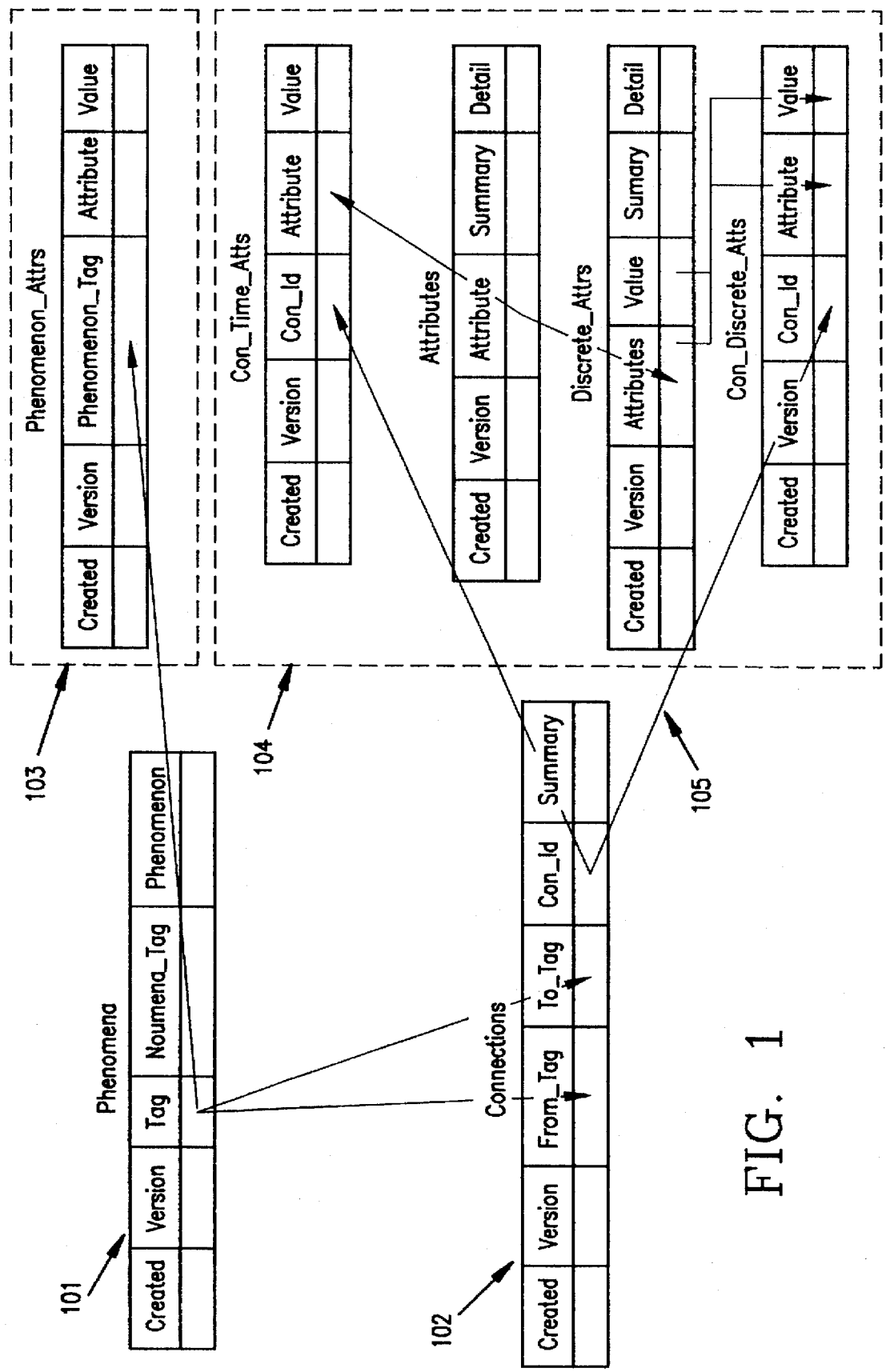
FIG. 1—Illustrates the basic structure of the present invention in terms of graph theory.

As seen in FIG. 1, in terms from graph theory, the Connections Server manages the graph which represents the interconnections in a hypermedia (or other "interconnected" presentation service). The Connections Server records in the Phenomena structure 101 the nodes (Phenomena or objects) and edges (Connections or links) in this graph. Information needed to find the raw data which makes up the phenomena, as well as the commands needed to instantiate (materialize) the information at each node is also recorded. This allows two Phenomena (user objects) to materialize the same Noumena (raw data) in different ways or to materialize different parts of a Noumena. It can optionally record attributes on either the nodes or edges. Such meta-data can be very useful when applications wish to traverse the graph.

Figure 2:
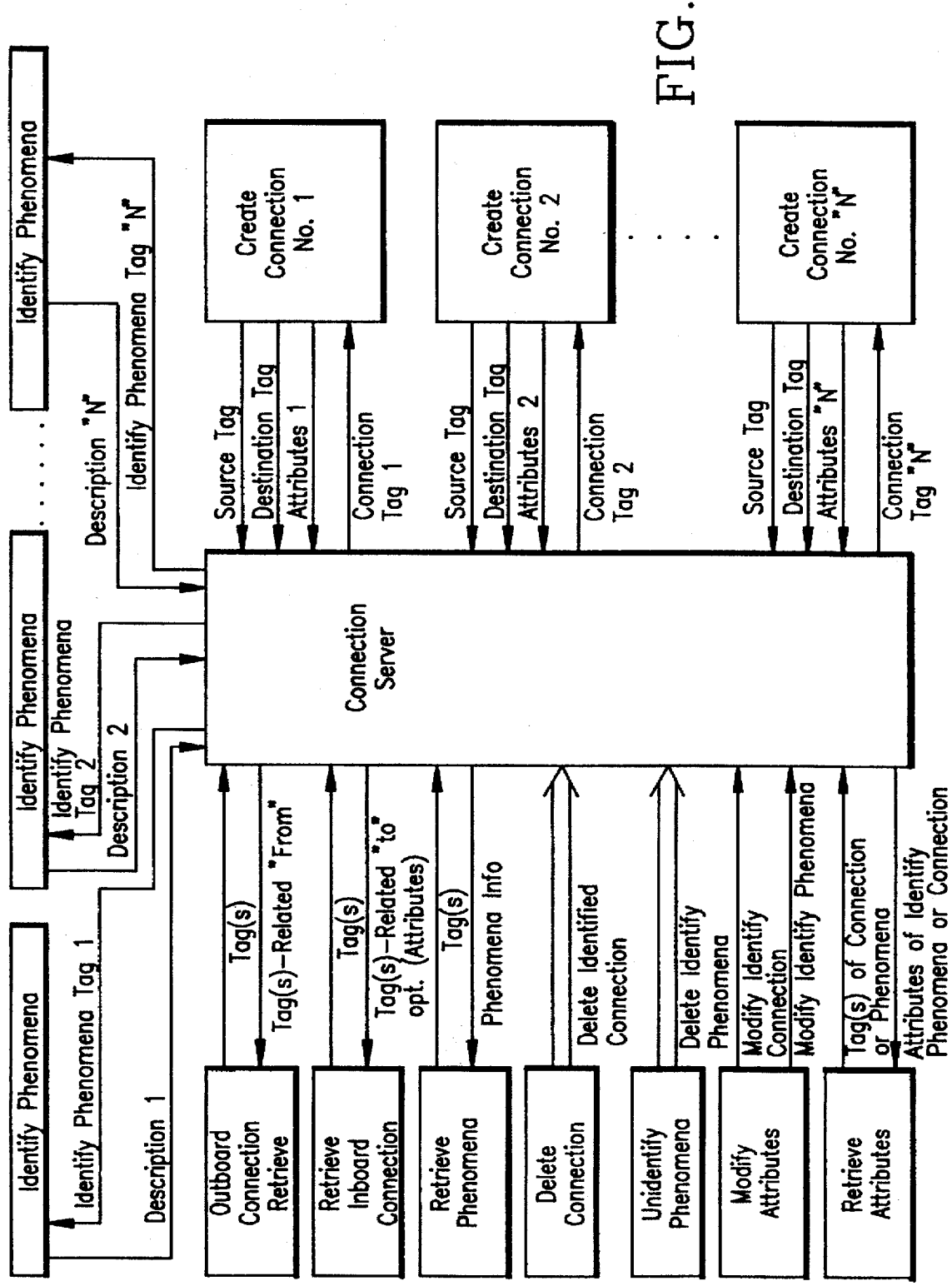
FIG. 2—Illustrates a flow chart representing the present invention.

Services to create, modify and delete nodes, edges and attributes are implemented using the data structure represented graphically in FIG. 2.

Note:

This description uses SQL and Relational Database Management System terminology. However, there is no dependency on or restriction to relational database for implementation.

To illustrate the usage of the database schema, the relationships to an instance of the Classification system data structures are shown (103, 104). They are labeled clearly and are NOT part of the Connection Server Database schema.

The arrows in FIG. 1. (e.g. 105) represent integrity constraints between the sub-structures. (See preferred embodiment for implementation and use).

A "version" field is provided in all sub-structures to support future versions of the data structures.

A "created" field is provided to time-stamp the creation of all entries into the logical model in all sub-structures.

OPERATIONS:

The Connection Server services are implemented in the following operations as shown in FIG. 2 and discussed hereafter:

Note:

All operations are atomic in nature. Either all changes are remembered or they are all forgotten (committed or rolled back). No partial changes persist.

IDENTIFY PHENOMENA (tag it) All Phenomena tracked by the Connection server must be uniquely identified. This identification is done by assigning an architected Tag, uniquely generated.

The IDENTIFY PHENOMENA operator acquires a new Tag and inserts the Phenomena description (meta-data) into the Connection Server. Since Phenomena are not allowed to be disconnected (graph theory meaning), the "identify operation" requires appropriate descriptive data to allow at least one Connection of the newly identified Phenomena to be inserted into the Connection Server.

The operation fails if the required definition (meta-data) or the Connection data is not adequate, therefore the Phenomena is not inserted.

CREATE CONNECTION: New Connections can be added as for example in the related materials "Method for Association of Heterogenous Information". CREATE CONNECTION records a new edge (graph theory notation), or Connection, between two previously identified Phenomena in the Connection Server. The "Method for Association of Heterogenous Information" system also records the attributes associated with this Connection and is identified as the Connection Attributes structure in the Connection Server.

RETRIEVE OUTBOUND CONNECTIONS: The RETRIEVE CONNECTION operation accepts Tags as input. The Connection Server returns to the requestor a list of symbolic pointers (e.g. Tags) to Phenomena connected to the Phenomena identified by the input Tag. Note that these Connections are directed FROM the Phenomena identified by the input Tag TO other Phenomena. Optionally accompanying each symbolic pointer is the corresponding collection of Connection Attributes and/or Phenomena Attributes.

RETRIEVE INBOUND CONNECTIONS: The RETRIEVE CONNECTION operation accepts Tags as input. The Connection Server returns to the requestor a list of symbolic pointer (e.g. Tags) to Phenomena Connected to the Phenomena identified by the input Tag. Note that these Connections are directed FROM other Phenomena TO the Phenomena identified by the input Tag. Optionally accompanying each symbolic pointer is the corresponding collection of Connection Attributes and/or Phenomena Attributed.

RETRIEVE PHENOMENA: The RETRIEVE PHENOMENA operation accepts Tags as input and returns to the requestor the data needed to recreate the Phenomena. Optionally accompanying each Phenomena is the corresponding of collection Phenomena Attributes.

DELETE CONNECTION (forget relationship): Connections may be removed from a Connection Server. This DELETE CONNECTION unrecords an existing Connection between two previously identified Phenomena in the Connection Server. The "Method for Association of Heterogenous Information" system also removes the Connection Attributes associated with this Connection.

UNIDENTIFY PHENOMENA: Phenomena in a Connection Server may deleted. This UNIDENTIFY PHENOMENA is logically equivalent to removing of the Phenomena (and any optional Phenomena attributes) and the deletion using DELETE CONNECTION of all associated Connections and their corresponding Connection Attributes.

OPTIONAL OPERATIONS:

MODIFY ATTRIBUTES: Since attributes (meta-data) may optionally be recorded by the Connections Server for both Phenomena and Connections, the MODIFY ATTRIBUTES operation is provided to allow applications to modify the attributes associated with a Phenomena or Connection. The MODIFY ATTRIBUTES operation requires as input the identifier (e.g Tags) or the Phenomena or Connection, a representation of the modification to be made i.e. INSERT, DELETE, etc. and attribute names and values, if needed for the specified operation.

RETRIEVE ATTRIBUTES: Since attributes (meta-data) may optionally be recorded by the Connections Server for both Phenomena and Connections, the RETRIEVE ATTRIBUTES operation is provided to allow applications to retrieve the attributes associated with a Phenomena or Connection. The RETRIEVE ATTRIBUTES operation requires as input the identifier (e.g Tags) of the Phenomena or Connection.

The Connection server supports links with or without attributes. By allowing the specification of classification attributes separately the use of user supplied criteria (attributes) is simplified. The use of "Tags", also simplifies external object (noumena identification reduces the storage requirements and the length of the internal communication traffic).

The Connection Server supports the dynamic addition of the connection simultaneously with use and manipulation of others. This is done by multi-tasking to enable concurrent access to the Connections.

This Connection Server points into the target Noumena, not just to them. This allows reduced storage, reduced redundancy and increased efficiency because partial materialization of a Phenomena can be supported.

The Connections Server handles redundancy appropriately. Phenomena introduced redundantly are stored only once. This reduction may be implemented as an asynchronous process. Connections introduced redundantly can be stored redundantly, potentially representing differing points of view.

The Connection Server connects heterogeneous objects. Architecturally Connection Servers may cooperate M-to-N with Noumena (raw data) Servers.

The Connection Server is process independent. The system design allows structural independence of most processes enabling exploitation of computers that may be loosely coupled, multi-threaded, support parallel processing and/or as a network (distributed) of Connection locations (nodes), This flexibility is in part attributable to the use of the tag architecture. This allows objects and connections to be identified universally. If Connections are moved or copied to or from a particular Connection Server the Tag architecture prevents identifier collisions.

The use of existing relational data base management systems to maintain the data structures described (see preferred embodiment) can also contribute to the adaptability of the Connection Server to various hardware architectures. A Relational Database management System can also assure the correct sharing semantics, backup, security, provide useful statistics, etc.

The Connections Server is also very adaptable to software architectures. The Noumena (raw data) upon which the phenomena depend, may be stored in directly accessible files, a noumena server, by an object request broker, or potentially, in other pre-existing systems (appropriate for legacy data).

The Connections Server is a very dynamic system subject to security constraints, users can assume the role of author (by adding Phenomena or Connections) or reader (by using Connections and viewing Phenomena) independently. The application determines the role(s) that can be assumed and it is completely reasonable that users could be allowed to participate in both roles (even simultaneously).

DESCRIPTION OF THE PREFERRED EMBODIMENTS

Notes:

This description uses SQL and Relational Database Management System terminology. However, there is no dependency on or restriction to a relational database for implementation.

---

Connections Server Database DDL
Datatypes:
    Created are TIMESTAMP
    Tags are varchar (30)
        Versions are Tags
        Connection Identifiers are Tags
        Creators are Tags
    Summary's are VARCHAR (50)
    Details are VARCHAR (2000)

---

Phenomena - a collection of Tags used to identify reproducible Phenomenon.

Columns:
    Created: Date/Time when a Phenomena row was inserted.
    Version: Version number of the row format.
    Tag: Tag used to identify the Phenomenon.
    Noumena Tag: Tag used to identify the Noumena underlying the Phenomenon.
    Phenomenon: The operation-system-independent command needed to produce the Phenomenon.
    Creator: Person/Process which inserted the Phenomenon. (not implemented)

CREATE TABLE Phenomena (
    Created        timestamp      NOT NULL,
    Version        varchar(30)    NOT NULL,
    Tag                varchar(30)    NOT NULL,
    Noumena_Tag    varchar(30)    NOT NULL,
    Phenomenon     varchar(1500)  NOT NULL,
    Creator        varchar(30)    NOT NULL,
    PRIMARY KEY (Tag)

```
FOREIGN KEY (Noumena_Tag) REFERENCES Noumena_Tags
  ON DELETE CASCADE
);
COMMENT OF TABLE Phenomena IS
  'One-to-One association between Tags and Phenomena';
CREATE UNIQUE INDEX Phenomena_IX1 ON Phenomena (
  Tag
);
CREATE INDEX Phenomena_IX2 ON Phenomena (
  Noumena_Tag
);
```

Connections - a collection of Connections between Phenomenon.

Columns:
    Created: Data/Time when a Connection row was inserted.
    Version: Version number of the row format.
    Con_Id: A Tag representing the unique connection.
    From_Tag: The tag representing the origination Phenomenon.
    To Tag: The tag representing the destination Phenomenon.
    Summary: A short "advertising" of what a user will see if the
    connection is followed.

```
CREATE TABLE Connections (
  Created      timestamp      NOT NULL,
  Version      varchar(30)    NOT NULL,
  Con_Id       varchar(30)    NOT NULL,
  From_Tag     varchar(30)    NOT NULL,
  To_Tag       varchar(30)    NOT NULL,
  Summary      varchar(50)    NOT NULL,
  PRIMARY KEY (Con_Id)
  FOREIGN KEY (From_Tag) REFERENCES Phenomena ON
    DELETE CASCADE
  FOREIGN KEY (To_Tag) REFERENCES Phenomena ON
    DELETE CASCADE
);
COMMENT OF TABLE Connection IS
  'Connections between two Phenomena wehich are represented
  by TAGs':
CREATE UNIQUE INDEX Connections_IX1 ON Connections (
  Con_Id
);
CREATE INDEX Connections_IX2 ON Connections (
  From_Tag
);
CREATE INDEX Connections_IX3 ON Connections (
  To_Tag
);
```

CONCLUSION

A system and method has been shown in the above embodiments for delivering the Connection service, with minimum effort, to find Phenomena of most interest, with the least cost and time, because each Connection represents an explicit relationship between the Connected Phenomena. While various preferred embodiments have been shown and described, it will be understood that there is no intent to limit the invention by such disclosure, but rather, is intended to cover all modifications and alternate constructions falling within the spirit and scope of the invention as defined in the appended claims.

We claim:

1. A computer-based method for creating, storing and managing connections between data objects, comprising the steps of:

receiving a first symbolic representation of a source data object, the first symbolic representation including a first unique object identifier;

receiving a second symbolic representation of a destination data object, the second symbolic representation including a second unique object identifier;

assigning a globally unique connection identifier to identify one or more connections between the two data objects, said connection reflecting a relationship between said source and destination objects;

receiving attributes of said relationship;

in computer memory, associating with the globally unique connection identifier: the first object identifier of the source object, identified as a source identifier, the second object identifier of the destination object, identified as a destination identifier and the received attributes with the object identifier, and whereby the connection of said source and destination objects, the objects or the attributes are retained within said computer memory for future retrieval and can be retrieved by using said globally unique connection identifier.

2. A computer-based method for creating, storing and managing connections between data objects as recited in claim 1, wherein the attributes of the data object may be modified upon receiving a request and description of a modification.

3. A computer-based method for creating, storing and managing connections between data objects as recited in claim 1, further comprising the steps of:

responsive to an operation request, identifying a set of object attributes associated with the data object, and responding to the operation request with the identified set of object attributes.

4. A computer-based method for creating, storing and managing connections between data objects as recited in claim 1, further comprising the steps of:

responsive to an operation request, identifying a set of object attributes associated with a data object, and deleting the object attributes.

5. A computer-based method for creating, storing and managing connections between data objects as recited in claim 1, wherein said retrieval step further comprises:

receiving a server operation request;

responsive to the operation request, receiving a globally unique object identifier, identifying a data object in the computer memory corresponding to the object identifier, and responding to the server operation request with the identified data object.

6. A computer-based method for creating, storing and managing connections between data objects as recited in claim 5, further comprising the step of responding to the server operation request with only the data needed to materialize the identified object.

7. A computer-based method for creating, storing and managing connections between data objects as recited in claim 1, further comprising the steps of:

receiving a server operation request, responsive to the operation request, receiving a globally unique object identifier, identifying a data object in the computer memory corresponding to the object identifier, identifying a set of connections in the computer memory which connect with the data object, deleting the data object and deleting the set of connections.

8. A computer-based method for creating, storing and managing connections between data objects as recited in claim 1, wherein said retrieval step further comprises:

receiving a server operation request, responsive to the operation request, receiving a globally unique object identifier, identifying a source data object in the computer memory corresponding to the object identifier, identifying a set of data objects in the computer memory which are destination objects of the set of connections from the source object, and responding to the server operation request with the identified set of data objects.

9. A computer-based method for creating, storing and managing connections between data objects as recited in claim 1, wherein said retrieval step further comprises:

receiving a server operation request, responsive to the operation request, receiving a globally unique object identifier, identifying a source data object in the connection server corresponding to the object identifier, identifying a set of data objects in the connection server which are sources to the source object, and responding to the server operation request with the identified set of data objects.

10. A computer-based method for creating, storing and managing connections between data objects as recited in claim 1, wherein said computer memory is non-volatile memory.

11. A computer-based method for creating, storing and managing connections between data objects as recited in claim 1, further comprising the step of:

in computer memory, associating with the connection identifier a connection timestamp for identifying a time of creation for the connection.

12. A computer-based method for creating, storing and managing connections between data objects as recited in claim 1, further comprising the step of:

in computer memory, associating with the connection identifier a connection version for identifying format.

13. A computer-based connection server for managing connections between data objects, comprising the steps of:

receiving a first server operation request;

responsive to the first server operation request, receiving an identified connection, a preexisting source object having a globally unique object identifier within the connection server, and a preexisting destination object having unique object identifier within the connection server, assigning a unique connection identifier to the identified connection, associating with the connection identifier the object identifier of the preexisting source object and the object identifier of the preexisting destination object, and inserting the connection and the identifiers into the connection server.

14. A computer-based connection server for managing connections between data objects as recited in claim 13, further comprising the steps of:

receiving attributes of the data object, and in computer memory, associating the received attributes with the object identifier.

15. A computer-based connection server for managing connections between data objects as recited in claim 14, wherein the attributes of the data object may be modified upon receiving a request and description of a modification.

16. A computer-based connection server for managing connections between data objects as recited in claim 14, further comprising the steps of:

responsive to a retrieve object attributes operation request, identifying a set of object attributes associated with the data object, and responding to the server operation request with identified set of object attributes.

17. A computer-based connection server for managing connections between data objects as recited in claim 14, further comprising the steps of:

responsive to an unidentify object attributes operation request, identifying a set of object attributes associated with the data object, and deleting the object attributes from the connection server.

18. A computer-based connection server for managing connections between data objects as recited in claim 13, further comprising the steps of:

receiving attributes of the connection, and in computer memory, associating the received attributes with the connection identifier.

19. A computer-based connection server for managing connections between data objects as recited in claim 18, wherein the attributes of the connection may be modified upon receiving a request and description of a modification.

20. The method as recited in claim 18, further comprising the steps of:

responsive to a retrieve connection attributes operation request, identifying a set of connection attributes associated with the set of connections, and responding to the retrieve connection attributes operation request with the identified set of connection attributes.

21. A computer-based connection server for managing connections between data objects as recited in claim 18, further comprising the steps of:

responsive to a delete connection attributes operation request, identifying a set of connections attributes associated with the connection, and deleting the connection attributes from the connection server.

22. A computer-based connection server for managing connections between data objects as recited in claim 18, further comprising the steps of:

receiving a retrieve object operation request, responsive to the retrieve object operation request, receiving a unique object identifier, identifying a data object in the connection server corresponding to the object identifier, and responding to the server operation request with the identified data object.

23. A computer-based connection server for managing connections between data objects as recited in claim 13, further comprising the steps of:

receiving a delete phenomena operation request, responsive to the delete phenomena operation request, receiving a unique object identifier, identifying a data object in the connection server corresponding to the object identifier, identifying a set of connections in the connection server which connect with the data object, deleting the reference to the pre-existing data object from the connection server, and deleting the set of connections from the connection server.

24. A computer-based connection server for managing connections between data objects as recited in claim 13, further comprising the steps of receiving a retrieve source connections operation request;

responsive to the retrieve source connections operation request:

receiving a unique object identifier, identifying a source data object in the connection server corresponding to the object identifier, identifying a set of data objects in the connection server which are destination objects of the set of connections from the source object, and responding to the server operation request with the identified set of data objects.

25. A computer-based connection server for managing connections between data objects as recited in claim 18, further comprising the steps of:

receiving a retrieve destination connections operation request, responsive to the retrieve destination connections operation request, receiving a unique object identifier, identifying a source data object in the connection server corresponding to the object identifier, identifying a set of data objects in the connection server wherein the identified source data object is a destination from other data objects, and responding to the server operation request with the identified set of data objects.

26. A computer-based connection server for managing connections between data objects as recited in claim 13, wherein said connection server uses non-volatile memory.

* * * * *

UNITED STATES PATENT AND TRADEMARK OFFICE
CERTIFICATE OF CORRECTION

PATENT NO. : 5,687,367

DATED : November 11, 1997

INVENTOR(S) : Dockter et al.

Page 1 of 3

It is certified that error appears in the above-identified patent and that said Letters Patent is hereby corrected as shown below:

<u>IN THE ABSTRACT</u>

Line 5, "connection" should be -- Connection --.

Column 1, line 32, application Ser. No. "08/263,379" should be -- 08/262,838 --.

Column 2, line 3, after "or datasets" insert --.--.

Column 2, line 25, "Connects" should be -- connects --.

Column 2, line 27, "Connect" should be -- connect --.

Column 2, line 58, after "descriptions" insert --,--.

Column 3, line 59, "Connections" should be -- Connection --.

Column 3, line 61, "Connections" should be -- Connection --.

Column 4, line 32, after "(tag it)" insert -- : --.

Column 4, line 33, "server" should be -- Server --.

Column 5, line 20, after "may" insert -- be --.

Column 5, line 27, "Connections" should be -- Connection --.

Column 5, line 34, before "i.e." insert -- ( --.

UNITED STATES PATENT AND TRADEMARK OFFICE
CERTIFICATE OF CORRECTION

PATENT NO. : 5,687,367
DATED : November 11, 1997
INVENTOR(S) : Dockter et al.

It is certified that error appears in the above-identified patent and that said Letters Patent is hereby corrected as shown below:

Column 5, line 34, after "etc." insert -- ) --.

Column 5, line 37, "Connections" should be -- Connection --.

Column 5, line 44, "server" should be -- Server --.

Column 5, line 46, after "separately" insert -- , --.

Column 5, line 59, "Connections" should be -- Connection --.

Column 6, line 4, after "(nodes)" delete "," and insert therefore --.--.

Column 6, line 9, after "Server" insert --,--.

Column 6, line 15, "management" should be -- Management --.

Column 6, line 18, "Connections" should be -- Connection --.

Column 6, line 19, after "(raw data)" insert --,--.

Column 6, line 24, "Connections" should be -- Connection --.

Column 7, line 28, after "CASCADE" insert -- , --.

UNITED STATES PATENT AND TRADEMARK OFFICE
CERTIFICATE OF CORRECTION

PATENT NO.  : 5,687,367
DATED       : November 11, 1997
INVENTOR(S) : Dockter et al.

It is certified that error appears in the above-identified patent and that said Letters Patent is hereby corrected as shown below:

Column 7, line 45, "Connection" should be -- connection --.

Column 10, line 45, "18" should be -- 13 --.

Column 11, line 4, after "of" insert -- : --.

Column 11, line 7, delete ":" and insert -- , --

Column 11, line 18, "18" should be -- 13 --.

IN THE DRAWINGS

Figure 1, element 104, "Sumary" should be -- Summary --.

Signed and Sealed this

Twenty-second Day of September, 1998

Attest:

BRUCE LEHMAN

Attesting Officer            Commissioner of Patents and Trademarks